United States Patent [19]

White

[11] Patent Number: 4,680,727
[45] Date of Patent: Jul. 14, 1987

[54] COMPLEX MULTIPLIER FOR BINARY TWO'S COMPLEMENT NUMBERS

[75] Inventor: Stanley A. White, Orange, Calif.

[73] Assignee: Rockwell International Corporation, El Segundo, Calif.

[21] Appl. No.: 653,179

[22] Filed: Sep. 24, 1984

[51] Int. Cl.[4] .............................................. G06F 7/52
[52] U.S. Cl. ..................................... 364/754; 364/757
[58] Field of Search ................ 364/754, 757, 759, 760

[56] References Cited

U.S. PATENT DOCUMENTS

| | | | |
|---|---|---|---|
| 3,926,367 | 12/1975 | Bond et al. | 364/754 |
| 4,275,452 | 6/1981 | White | 364/759 |
| 4,344,151 | 8/1982 | White | 364/754 |
| 4,354,249 | 10/1982 | King et al. | 364/754 |

FOREIGN PATENT DOCUMENTS 58-223846  12/1983  Japan .................................... 364/754

Primary Examiner—Archie E. Williams, Jr.
Assistant Examiner—Long Nguyen
Attorney, Agent, or Firm—H. Fredrick Hamann; George A. Montanye; David J. Arthur

[57] ABSTRACT

A method and apparatus for multiplying two digital pairings representing complex numbers is described. The method includes preloading a memory with contents based on the second complex combination and the basis vector, and repeatedly addressing the memory based on the first complex combination taken L bits at a time in order to accumulate a complex product combination. The complex multiplication apparatus is preferably constructed as high speed circuitry on a gallium arsenide integrated circuit chip.

20 Claims, 10 Drawing Figures

F/R SELECTION LOGIC (104)

| $\alpha_{2n}$ | | 0 | 0 | 1 | 1 |
|---|---|---|---|---|---|
| $\alpha_{2n+1}$ | | 0 | 1 | 1 | 0 |
| 1 | 0 | F | R | F | F |
| 1 | 1 | R | R | F | R |
| 0 | 1 | F | F | F | R |
| 0 | 0 | F | R | R | R |
| $\beta_{2n}$ | $\beta_{2n+1}$ | | | | |

FIG.6

| Addressing Bits | | | | MEMORY ADDRESS | An | Bn | ORDER | ±A | ±B |
|---|---|---|---|---|---|---|---|---|---|
| $\alpha_{2n}$ | $\alpha_{2n+1}$ | $\beta_{2n}$ | $\beta_{2n+1}$ | | | | | | |
| 0 | 0 | 0 | 0 | M0 | $1/4(-3c+3d) = QA0$ | $1/4(-3c-3d) = QB0$ | F | + | + |
| 0 | 0 | 0 | 1 | M1 | $1/4(-3c+d) = QA1$ | $1/4(-c-3d) = QB1$ | F | + | + |
| 0 | 0 | 1 | 0 | M2 | $1/4(-3c-d) = QA2$ | $1/4(c-3d) = -QB2$ | F | + | − |
| 0 | 1 | 0 | 0 | M0 | $1/4(-3c-3d) = QB0$ | $1/4(3c-3d) = -QA0$ | R | + | − |
| 0 | 1 | 0 | 1 | M2 | $1/4(-c+3d) = QB2$ | $1/4(-3c-d) = QA2$ | R | + | + |
| 0 | 1 | 1 | 0 | M3 | $1/4(-c+d) = QA3$ | $1/4(-c-d) = QB3$ | F | + | + |
| 0 | 1 | 1 | 1 | M3 | $1/4(-c-d) = QB3$ | $1/4(c-d) = -QA3$ | R | + | − |
| 1 | 0 | 0 | 0 | M1 | $1/4(-c-3d) = QB1$ | $1/4(3c-d) = -QA1$ | R | + | − |
| 1 | 0 | 0 | 1 | M1 | $1/4(c+3d) = -QB1$ | $1/4(-3c+d) = QA1$ | R | − | + |
| 1 | 0 | 1 | 0 | M3 | $1/4(c+d) = -QB3$ | $1/4(-c+d) = QA3$ | R | − | + |
| 1 | 0 | 1 | 1 | M3 | $1/4(c-d) = -QA3$ | $1/4(c+d) = -QB3$ | F | − | − |
| 1 | 1 | 0 | 0 | M2 | $1/4(c-3d) = -QB2$ | $1/4(3c+d) = -QA2$ | R | − | − |
| 1 | 1 | 0 | 1 | M0 | $1/4(3c+3d) = -QB0$ | $1/4(-3c+3d) = QA0$ | R | − | + |
| 1 | 1 | 1 | 0 | M2 | $1/4(3c+d) = -QA2$ | $1/4(-c+3d) = QB2$ | F | − | + |
| 1 | 1 | 1 | 1 | M1 | $1/4(3c-d) = -QA1$ | $1/4(c+3d) = -QB1$ | F | − | − |
| 1 | 1 | | 1 | M0 | $1/4(3c-3d) = -QA0$ | $1/4(3c+3d) = -QB0$ | F | − | − |

FIG. 7

| Addressing Bits | | | | | MEM ADDR | An' | Bn' | ±A | ±B |
|---|---|---|---|---|---|---|---|---|---|
| $\alpha_{2n}$ | $\alpha_{2n+1}$ | $\beta_{2n}$ | $\beta_{2n+1}$ | | | | | | |
| 0 | 0 | 0 | 0 | | M0 | $1/4(-3c+3d) = QA0$ | $1/4(-3c) = QB0$ | + | + |
| 0 | 0 | 0 | 1 | | M1 | $1/4(-3c+d) = QA1$ | $1/4(-c-2d) = QB1$ | + | + |
| 0 | 0 | 1 | 0 | | M2 | $1/4(-3c-d) = QA2$ | $1/4(c-4d) = QB2$ | + | − |
| 0 | 0 | 1 | 1 | | M3 | $1/4(-3c-3d) = QA3$ | $1/4(3c-6d) = -QB3$ | + | − |
| 0 | 1 | 0 | 0 | | M4 | $1/4(-c+3d) = QA4$ | $1/4(-3c+2d) = QB4$ | + | + |
| 0 | 1 | 0 | 1 | | M5 | $1/4(-c+d) = QA5$ | $1/4(-c) = QB5$ | + | − |
| 0 | 1 | 1 | 0 | | M6 | $1/4(-c-d) = QA6$ | $1/4(c-2d) = -QB6$ | + | + |
| 0 | 1 | 1 | 1 | | M7 | $1/4(-c-3d) = QA7$ | $1/4(3c-4d) = -QB7$ | + | − |
| 1 | 0 | 0 | 0 | | M7 | $1/4(c+3d) = -QA7$ | $1/4(-3c+4d) = QB7$ | − | + |
| 1 | 0 | 0 | 1 | | M6 | $1/4(c+d) = -QA6$ | $1/4(-c+2d) = QB6$ | − | + |
| 1 | 0 | 1 | 0 | | M5 | $1/4(c-d) = -QA5$ | $1/4(c) = -QB5$ | − | − |
| 1 | 0 | 1 | 1 | | M4 | $1/4(c-3d) = -QA4$ | $1/4(3c-2d) = -QB4$ | − | − |
| 1 | 1 | 0 | 0 | | M3 | $1/4(3c+3d) = -QA3$ | $1/4(-3c+6d) = QB3$ | − | + |
| 1 | 1 | 0 | 1 | | M2 | $1/4(3c+d) = -QA2$ | $1/4(-c+4d) = QB2$ | − | + |
| 1 | 1 | 1 | 0 | | M1 | $1/4(3c-d) = -QA1$ | $1/4(c+2d) = -QB1$ | − | + |
| 1 | 1 | 1 | 1 | | M0 | $1/4(3c-3d) = QA0$ | $1/4(3c) = -QB0$ | − | − |

COMPLEX MULTIPLIER FOR BINARY TWO'S COMPLEMENT NUMBERS

FIELD OF THE INVENTION

This invention concerns digital electronic computer architectures and particularly relates to multipliers for computing the product of two words representing two complex numbers.

BACKGROUND OF THE INVENTION

In the field of signal processing, there is a need to perform complex multiplications on signal samples; that is, an incoming signal sample may be in the form of a binary digital word having a primary group of binary bits corresponding to the real component of a complex number, and having a secondary group of binary bits corresponding to the imaginary component of a complex number. A complex number is a number having a real component and an imaginary component. The complex number is, by convention, considered a quantity which may be expressed as components in two-dimensional space in the direction of a pair of basis vectors. Basis vectors are vectors of unit length in a two dimensional space which may or may not be referred to and symbolically operated upon as a complex number. For example, a signal sample may be considered as a vector which is represented by a complex number with a first component corresponding to the amplitude of the signal sample, and a second component corresponding to the phase of the signal sample. This vector may also be expressed in components which have been conventionally resolved to lie on the real and the imaginary axes or more generally as components along any pair of non-colinear axes. Filtering and other signal processing operations may be performed on the incoming signal samples by a complex multiplier which performs the operation corresponding to multiplication of complex numbers.

A prior art complex multiplier is disclosed in detail in the description accompanying FIG. 1.

SUMMARY OF THE INVENTION

A first complex multibit digital word may be provided which has a primary portion denoting the real component of a complex number, and which has a secondary portion denoting the imaginary component of a complex number. A second complex multibit digital word may be provided which has a primary portion denoting the real component of a complex number, and which has a secondary portion denoting the imaginary component of a complex number. The complex multiplier of this invention may be used to multiply the first and second complex words together in order to produce a complex product multibit digital word denoting the multiplication product of the complex numbers denoted by the first and second complex words. The complex multiplier of this invention may be used to process complex words denoting complex numbers having non-orthogonal basis vectors. Also, the complex multiplier of this invention allows a series of multiplications to be performed in which a plurality of complex words are multiplied by a stored complex word to produce a plurality of complex product words.

The multiplier operates by preloading a read-only memory (in the case of fixed coefficients), or a random-access memory (in the case of variable coefficients) with contents based on the second complex word. The contents of the memory are then addressed by successive groups of bits of the first complex word. The contents retrieved are combined in an accumulating adder/subtractor sequentially as the groups of bits of the first complex word are successively used to address the memory.

Such a complex multiplier would be used in typical complex signal analysis such as computation of the discrete Fourier transform for radar and sonar applications, for performing frequency shifts in FDM/TDM communications systems, for passband line equalization in data modems, and many similar types of computations.

The architecture of the multiplier allows high speed operation with a small number of components thus allowing computers of small physical size and low power dissipation to be constructed and to perform real-time signal processing tasks at increased speeds.

DESCRIPTION OF THE DRAWINGS

FIG. 6 is a table of the forward/reverse selection logic used by the controller of FIG. 4 to control the memory segment select switches.

FIG. 7 is a table describing the contents and addressing of the memory of FIG. 4.

FIG. 8 is a table describing the contents and addressing of the memory of FIG. 3 for the particular case of a parallelism indicator L equal to 2, with not necessarily orthogonal basis vectors as shown in FIG. 9.

DESCRIPTION OF THE PREFERRED EMBODIMENT

Figure 1:
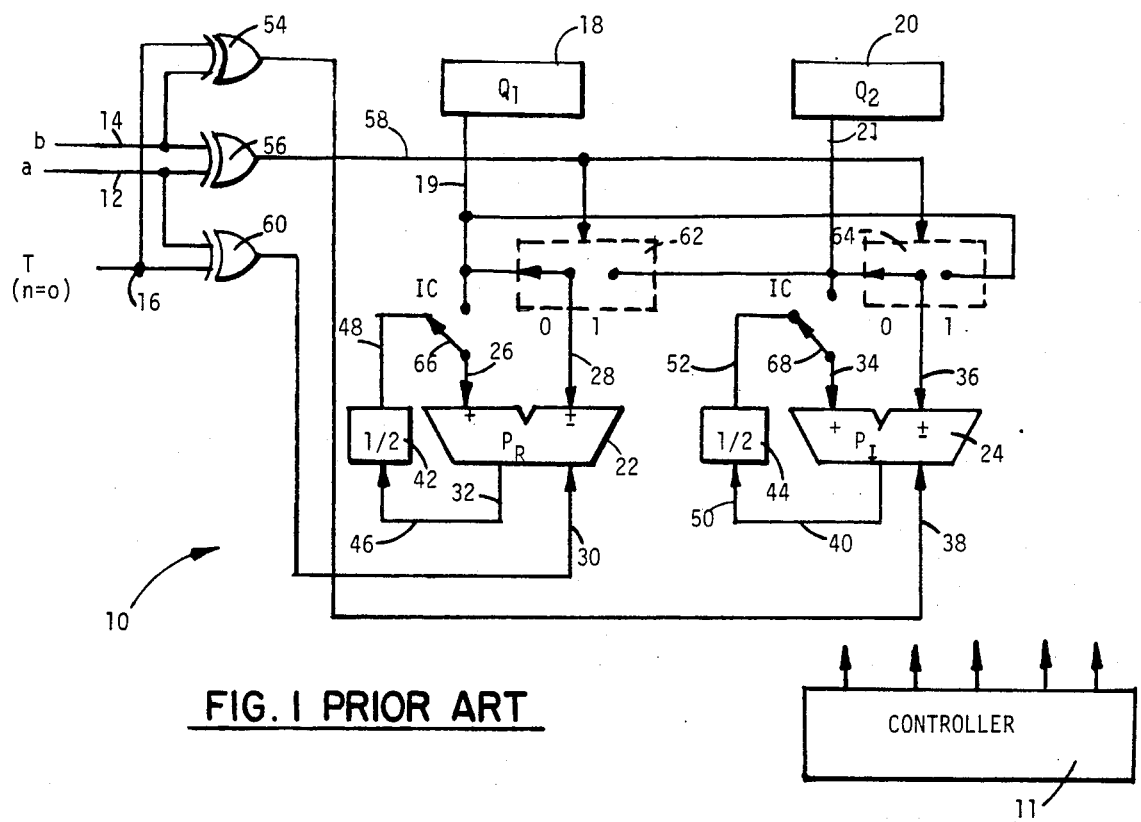
FIG. 1 shows a prior art complex multiplier architecture.

Before proceeding directly to a description of the preferred embodiment of this invention, the prior art complex multiplier 10 of FIG. 1 will be briefly discussed. The multiplier 10 has an input 12 for receiving a multi-bit digital word representing the real component "a" of a complex multiplicand. The multiplier 10 has an input 14 for receiving a multi-bit digital word representing the imaginary component "b" of a complex multiplicand. The input 12 receives a real data word "a" bit serially with one binary bit being presented at any one time, and with the word bits being received one after the other, beginning with the least-significant bit and ending with the sign bit. Similarly, the input 14 receives an imaginary data word "b" bit serially. The multiplier 10 also has a control input 16 for receiving a signal T. The signal T is generally equal to a binary zero, excepting that it is equal to a binary one when the zeroth bit of the real and imaginary data words are being received on the inputs 12 and 14.

The multiplier 10 has registers 18 and 20 for storing multi-bit digital words corresponding to the values of symbols $Q_1$ and $Q_2$, respectively, as defined on lines A18 and A19 of Appendix A. The values of symbols $Q_1$ and $Q_2$ are mathematically related to the values of the real and imaginary components, c and d, of a complex multiplier. The registers 18 and 20 have outputs 19 and 21, respectively, for supplying multi-bit digital words corresponding to the values of symbols $Q_1$ and $Q_2$, respectively.

The multiplier 10 also has arithmetic units 22 and 24 for performing summations and subtractions. The logic unit 22 has data inputs 26 and 28, a control input 30, and an output 32. When the control input 30 is a binary zero, the logic unit 22 adds together the multi-bit digital words present on the inputs 26 and 28, and produces a multi-bit digital sum word on the output 32. When the control input 30 is a binary one, the logic unit 22 subtracts the multi-bit digital word on the input 28 from the word on the input 26, and produces a multi-bit digital difference word on the output 32. The logic unit 24 is constructed similarly to the logic unit 22, and has inputs 34, 36, and 38 and output 40 corresponding to the inputs 26, 28, and 30 and output 32, respectively, of logic unit 22. The output 32 produces the multiplication product real component A and the output 40 produces the multiplication product imaginary component B.

The multiplier 10 also has dividers 42 and 44 which are similarly constructed and which perform a divide-by-two operation by right shifting an input binary word by one bit position to produce an output binary word. The divider 42 has an input 46 connected to the output 32 and an output 48. The divider 44 has an input 50 connected to the output 40 and an output 52.

The multiplier 10 has an XOR gate 54 having a pair of gate inputs connected to the multiplier inputs 14 and 16, respectively, and an output connected to the control input 38 of logic unit 24. The multiplier 10 has an exclusive or (XOR) gate 56 having a pair of gate inputs connected to the multiplier inputs 12 and 14, respectively, and an output 58 for producing a select control signal. The multiplier 10 has an exclusive or (XOR) gate 60 having inputs connected to the multiplier inputs 12 and 16, respectively, and an output connected to the control input 30 of logic unit 22.

The multiplier 10 has switches 62, 64, 66, and 68 which are used to control the transfer of digital words inside the multiplier 10. The switch 62 has a control input connected to the output 58, inputs connected to the outputs 19 and 21, respectively, and an output connected to the input 28. Similarly, the switch 64 has a control input connected to the output 58, inputs connected to the outputs 19 and 21, respectively, and an output connected to the input 36. When the output 58 has a binary zero signal, the input 28 is connected to the output 19 by switch 62 and the input 36 is connected to the output 21 by switch 64. The switch 66 is used to connect the input 26 to outputs 48 and 19, with switch 66 allowing selection between outputs 48 and 19. Similarly, switch 68 allows input 34 to be selectively connected to either of outputs 52 and 21.

The multiplier 10 is operated by first setting switches 66 and 68 in an initial-condition position with inputs 26 and 34 connected to outputs 19 and 21, respectively, so that the contents of registers 18 and 20 are added to the appropriate values which have been selected by switches 62 and 64, and loaded into the logic units 22 and 24, respectively, as the least significant bits of "a" and "b" are clocked into inputs 12 and 14. Next, the position of the switches 66 and 68 is changed so that inputs 26 and 34 are connected to outputs 48 and 52, respectively. The remaining binary bits of the real and imaginary data components "a" and "b" are simultaneously shifted into the inputs 12 and 14 bit serially so that operation of the switches 62 and 64, and addition/subtraction selections are made by the control inputs 30 and 38 of the logic units 22 and 24. The data components "a" and "b" are multi-bit digital words with a bit-position label n. The logic units 22 and 24 perform addition/subtraction operations as each bit of the "a" and "b" data is received in the inputs 12 and 14. At the completion of the operation, the outputs 32 and 40 contain the final product components A and B.

Referring next to Appendix A, equations detailing the operation of the prior art multiplier 10 of FIG. 1 are presented, with each line of Appendix A being accompanied by a label (A1–A18) in the right hand column of Appendix A. The product P is defined as the result of multiplying the input data $a+jb$ by a weighting coefficient $c+jd$ as in lines A1 and A2. Line A3 shows that a conventional mechanization for a complex multiplication requires four real multiplies, one real add, and one real subtract. Line A4 illustrates that the equation of line A3 may be rearranged to allow complex multiplication with three real multiplies, two real additions, and three real subtractions. Lines A5–A11 illustrate the way in which the multiplicand components "a" and "b" may be expressed in terms of N-bit words having bit sequences $\alpha$ and $\beta$, respectively. Lines A12–A15 illustrate the way in which the product P components A and B may be expressed by substituting the expressions of lines A7 and A11 into the equation of line A3; and by using words comprised of weighted-and-summed whole-value sequences $A_n$ and $B_n$, respectively. Lines A16 and A17 also provide for initial condition values $A_{IC}$ and $B_{IC}$ to be initially placed in the logic units 22 and 24, respectively.

In the Table 1 of Appendix A, the multi-bit digital values of the symbols $A_n$ and $B_n$ corresponding to the possible combinations of the values of the binary bits $\alpha_n$ and $\beta_n$ are shown, as defined by the relationships shown on lines A14–A17. Lines A18 and A19 define the symbols $Q_1$ and $Q_2$ which represent the possible values of the symbols $A_n$ and $B_n$. The relationships shown on lines A20 and A21 express the definitions of lines A18 and A19 applied to the combinations shown in Table 1. The relationships of lines A20 and A21 are implemented by the logic circuitry of FIG. 1. The relationships of lines A22 and A23 show the initial conditions which are used by the circuitry of FIG. 1, as described above when the switches 66 and 68 are set to an initial condition position with inputs 26 and 34 connected to outputs 19 and 21, respectively.

The multiplier 10 also includes a controller 11 which controls the operation of the switches 66 and 68 and controls the actuation of the adder/subtractor units 22 and 24. The controller 11 also sets the state of the switches 66 and 68, i.e., whether recirculated inputs or initial condition inputs are received by the adder/subtractor units 22 and 24 and also controls the time when switches 66 and 68 change state. The state of the switches 62 and 64 is set by the control line 58 as described above.

This completes the description of the prior art. We shall now describe the subject invention.

The first improvement in the prior art lies in speeding up the computation by addressing the memory by "a" and "b" not one bit at a time but L bits at a time. This is described by the equations of Appendix B. The operations required to generate the products A and B then require N/L clock cycles, rather than N clock cycles. The quantities which are to be stored in the memories are given by (B2) and (B5), initial conditions are given by (B3) and (B6), and the combining equations are given by (B1) and (B4). Changes in embodiment therefore lie in the addressing of the coefficient memory by 2L lines rather than by 2 lines, and by the divide operations being by a factor of $2^L$ rather than by a factor of 2. The details are described below.

Figure 2:
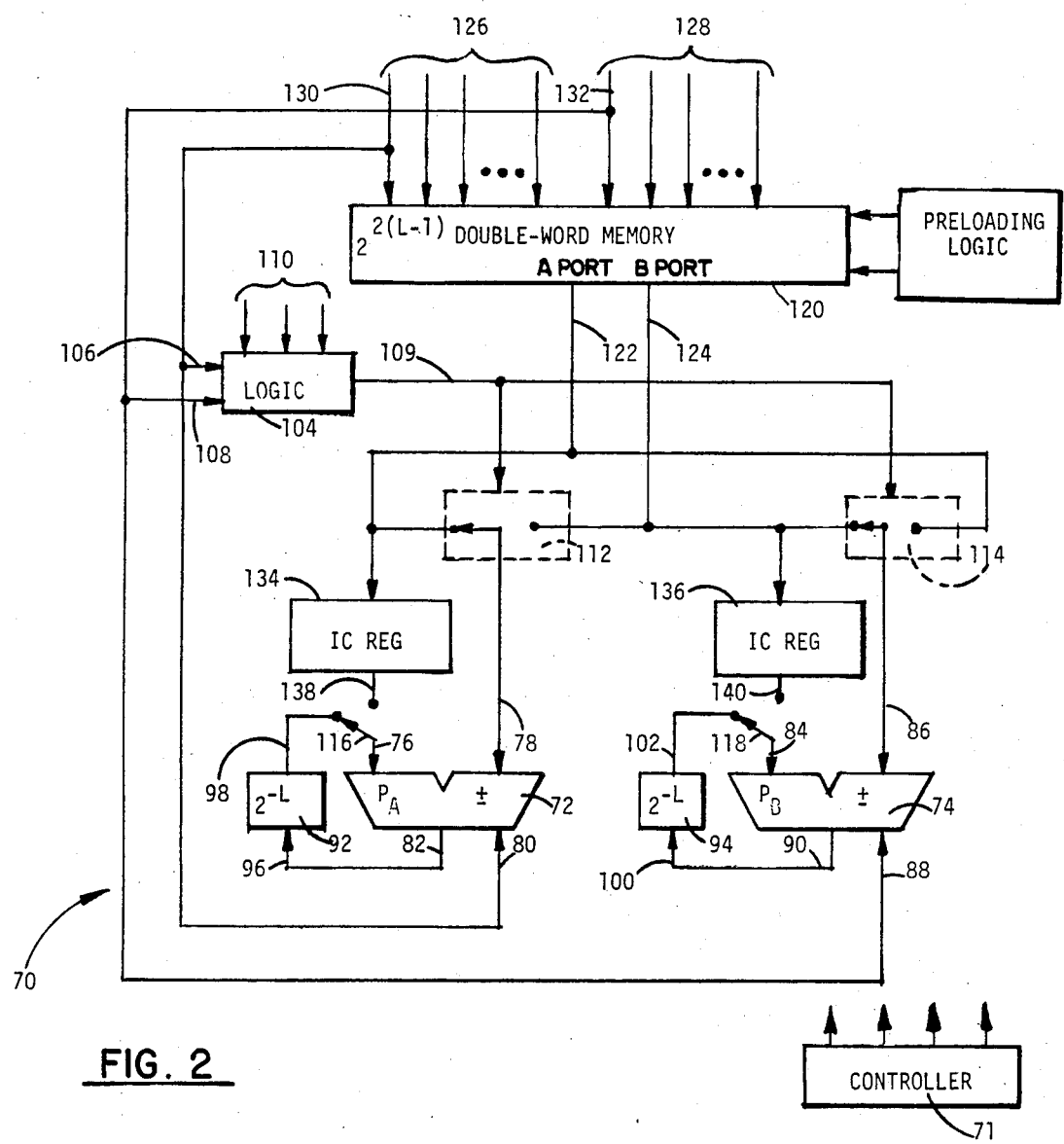
FIG. 2 shows a block diagram of a complex multiplier architecture of this invention which is set up for handling complex numbers with orthogonal basis vectors and which uses separable initial-condition registers.

Referring next to FIG. 2, the complex multiplier 70 has logic units 72 and 74 for performing summations and subtractions. The logic unit 72 has data inputs 76 and 78, a control input 80, and an output 82. When the control input 80 is a binary zero, the logic unit 72 adds together the multi-bit digital words present on the inputs 76 and 78, and produces a multi-bit digital sum word on the output 82. When the control input 80 is a binary one, the logic unit 72 subtracts the multi-bit digital word on the input 78 from the word on the input 76, and produces a multi-bit digital difference word on the output 82. The logic unit 74 is constructed similarly to the logic unit 72, and has inputs 84, 86, and 88 and output 90 corresponding to the inputs 76, 78, and 80 and output 82, respectively, of logic unit 72. The output 82 produces the multiplication product real component A and the output 90 produces the multiplication product imaginary component B.

The multiplier 70 also has scaling multipliers 92 and 94 which are similarly constructed and which perform a multiply by $2^{-L}$ (where L is a symbol having a predetermined value) operation by right shifting an input binary word by L bit positions to produce an output binary word. The scaler multiplier 92 has an input 96 connected to the output 82 and an output 98. The scaling multiplier 94 has an input 100 connected to the output 90 and an output 102.

The complex multiplier 70 has a logic controller 104 with a pair of binary digital inputs 106 and 108. The inputs 106 and 108 are connected to the control inputs 80 and 88, respectively, which are connected to the input lines 130 and 132, respectively. The logic controller 104 has an output 109. The logic controller 104 has a plurality of inputs 110.

The multiplier 70 has switches 112, 114, 116, and 118 which are used to control the transfer of digital words inside the multiplier 70. The switch 112 has a control input connected to the output 109, inputs connected to the outputs 122 and 124, respectively, and an output connected to the input 78. Similarly, the switch 114 has a control input connected to the output 109, inputs connected to the outputs 122 and 124, respectively, and an output connected to the input 86. When the output 109 has a binary zero signal, the input 78 is connected to the output 122 by switch 112, and the input 86 is connected to the output 124 by switch 114. Conversely, when the output 109 has a binary one signal, the input 78 is connected to the output 124 by switch 112, and the input 86 is connected to the output 122 by the switch 114. The switch 116 is used to connect the input 76 to outputs 98 and 138, with switch 116 allowing selection between outputs 98 and 138. Similarly, switch 118 allows input 84 to be selectively connected to either of outputs 102 and 140.

The multiplier 70 includes a memory 120 having real and imaginary addressing input ports 126 and 128, respectively, with each of the ports having a plurality of digital input lines for receiving subwords in parallel, with the subwords each having L bits, and with the subwords being taken from the multiplicand real and imaginary components (a, b). For example, if L is set to a value of two, and "a" and "b" are sixteen bit words, then a and b would be each split into eight subwords with two bits per subword. The digital input line 130 (carrying the most-significant bit of each subword of "a" of the input port 126 is connected to the input 106 of logic 104. The digital input line 132 (carrying the most-significant-bit of each subword of "b") of the input port 128 is connected to the input 108 of logic 104. The memory 120 has a pair of multi-bit digital output ports 122 and 124.

The multiplier 70 includes initial condition storage registers 134 and 136 which have inputs connected to the outputs 122 and 124, respectively. The registers 134 and 136 have outputs 138 and 140, respectively.

Figure 3:
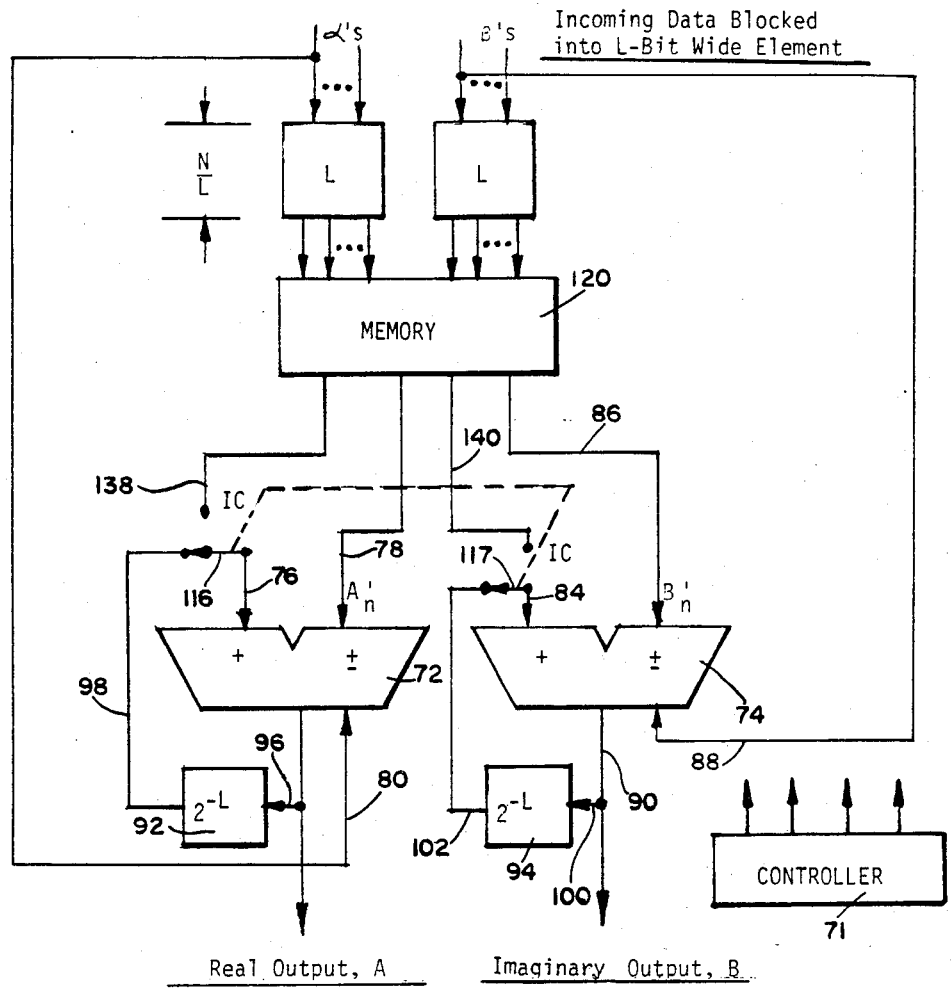
FIG. 3 shows a complex multiplier architecture of this invention which uses initial condition outputs from addresses inside a RAM.

FIG. 3 differs from FIG. 2 in two ways: the initial condition registers 134 and 136, and the selection switches 112 and 114, have been incorporated into the memory, 120. As a consequence, the memory has four output ports rather than 2; however, no time is lost in loading registers 134 and 136.

Figure 4:
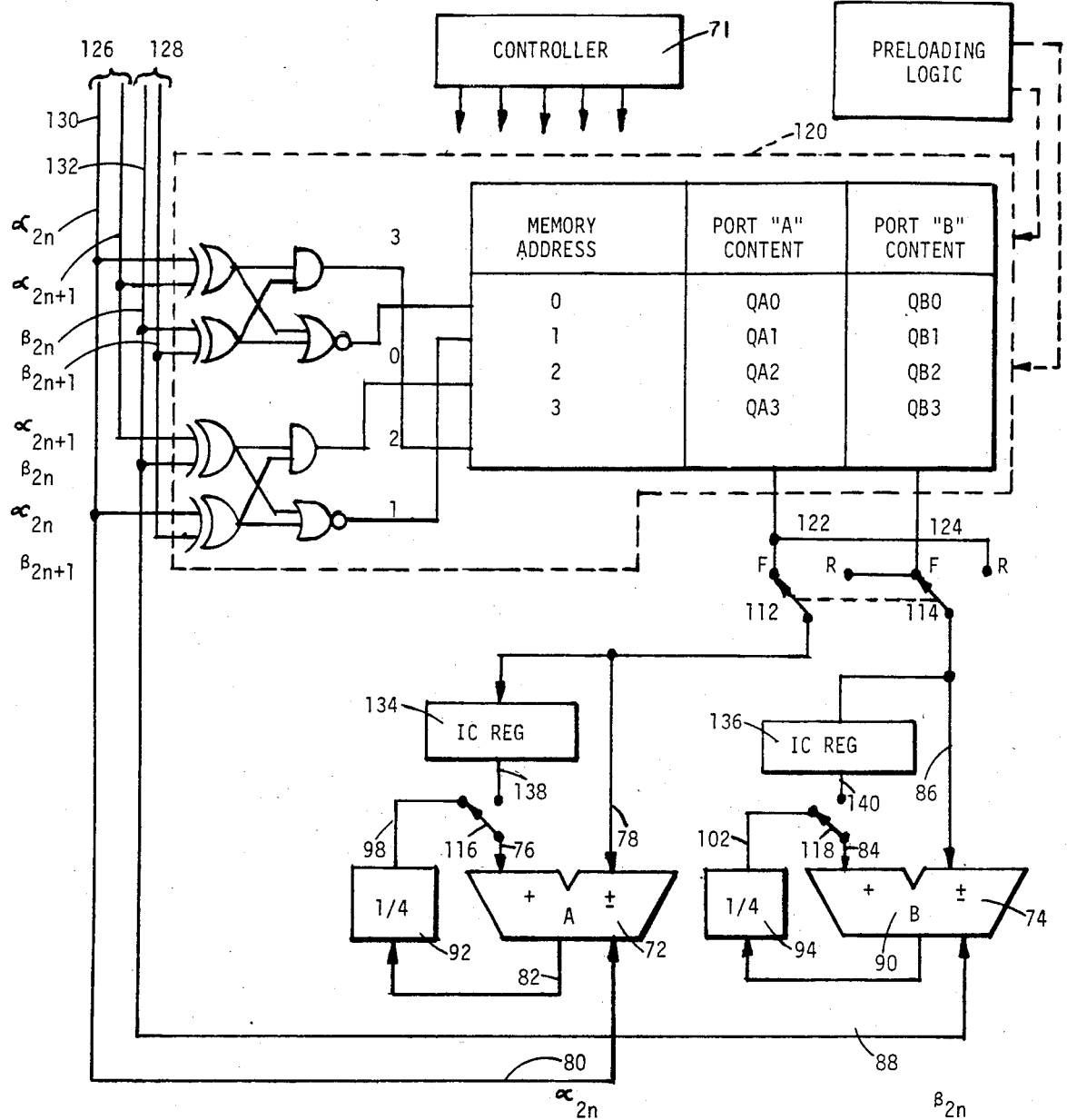
FIG. 4 shows a complex multiplier architecture of this invention for the particular case of a parallelism indicator L equal to 2, and which is set up for handling complex numbers with orthogonal basis vectors and which uses separable initial-condition registers.

In FIG. 4, we show the configuration which was discussed above in general terms, and which was shown more generally in FIG. 2, specialized to L=2 for purposes of illustration. The means of addressing the four memory location, M0–M3, are shown. Each memory location, Mj, contains two words, A'j and B'j, which are read out of the "A" and "B" ports, respectively.

Figure 5:
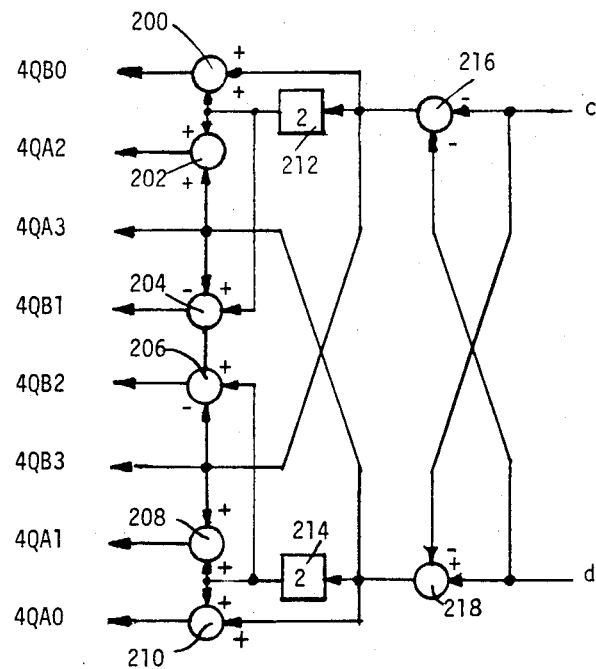
FIG. 5 is a diagram of the preloading logic for use with the architecture of FIG. 4.

FIG. 5 shows a means of combining the components, "c" and "d", in preparation for loading the memory. The circuitry of FIG. 5 includes a plurality of arithmetic combination elements 200–210 and 216 and 218. Each of the arithmetic combination elements has a plurality of inputs marked with "plus" or "minus". The function of each of the arithmetic combination elements is to add or subtract the signals input to it, with the addition or subtraction operation being determined by the presence of the "plus" or "minus", respectively, labels. The circuitry of FIG. 5 also includes multiplication elements 212 and 214 which function to multiply their input signals by a constant factor, in this case the factor 2, and produce a corresponding output. The inputs labeled "c" and "d" appearing on the right hand side of FIG. 5 are the signals as previously defined herein. On the left hand side of FIG. 5, output lines are labeled 4QB0, 4QA2, 4QA3, 4QB1, 4QB2, 4QB3, 4QA1, and 4QA0 which correspond to the electrical output signals produced by the circuitry of FIG. 5 which correspond to the contents of the memory array shown in FIG. 4, memory element 120. The labels on the left hand side of FIG. 5 have values which are defined by the equations C24 and C34 of Appendix C hereto. The labels on the left side of FIG. 5 consist of four digits, the first digit being a 4 indicating that the computation results have a magnitude four times larger than that which is to be loaded in the memory segment 120. The second character of each label on the left side of FIG. 5 is a Q indicating that the symbol corresponds to the quantity. The third character of each label on the left side of FIG. 5 is an "A" or a "B" indicating which port of the memory segment, i.e. port A or port B, of memory segment 120 is appropriate. The last character of each label on the left side of FIG. 5 is the numerical digit 0 through 3 for indicating the sequential memory address of the memory segment 120 which is to be used for the computed result. The combining logic 104 of FIG. 2 is mechanized according to the selection logic table of FIG. 6. The output states are F and R. State F indicates a forward relationship exists between memory port and accumulator description, i.e., that the output of memory port "A" is added to (or subtracted from, depending upon the sign) the "A" accumulator and that the output of memory port "B" is similarly added to (or subtracted from, depending upon the sign) the "B" accumulator. State R indicates that a reversal relationship exists between memory port and accumulator designation, i.e., that the output of memory port "A" is added to (or subtracted from, depending upon the sign) the "B" accumulator, and that the output of memory port "B" is added to (or subtracted from, depending upon the sign) the "A" accumulator. FIG. 7 shows, for the 16 possible combinations of the addressing bits ($\alpha_{2n}$, $\alpha_{2n+1}$, $\beta_{2n}$, and $\beta_{2n+1}$) the memory addresses (M0, M1, M2 and M3) and the memory locations for ports A and B. We see that there are only 8 distinct quantities. QA0, QA1, QA2, and QA3 which are read out through port A, corresponding to memory addresses 0, 1, 2, and 3, respectively through Port A; and QB0, QB1, QB2, and QB3 which are read out through Port B corresponding to those same respective memory addresses. The order logic is driven according to the entries in the "ORDER" column, and the add/subtract commands for the inputs to the "A" and "B" accumulator are given by the entries in the two rightmost columns of FIG. 7.

The next improvement in the prior art is the generalization of the basis vectors which are used to express the complex numbers. By expressing complex numbers in terms of basis vectors 1 and v where $1 \cdot v \neq 0$, rather than the more restrictive case where $1'v = 0$, we have a much more powerful computing technique and, through its embodiment, a much more powerful computing device. In order to facilitate the development, we shall develop the cases for which the relationship holds: $v^2 = f_1 + vf_2$. This situation arises, for example, when we are working with systems of radix $R = 2^N 3^M$ where N and M are integers. We therefore are now examining technique for using a digital computer for forming the generalized complex product $A + vB$ of a multiplier complex number $a + vb$ and a multiplicand complex number $c + vd$, wherein "v" is a basis vector, which is not necessarily orthogonal to the real axis, and wherein the symbols A and B are each desired outputs, said technique including the steps of:

predetermining the value of symbols $f_1$ and $f_2$ in accordance with the equation $v^2 = f_1 + vf_2$ for use in the equations below;

determining the values of symbol $A_n'$ in accordance with the equation $$A'_n = \sum_{l=0}^{L-1} A_{nL+l} 2^{-l} = (\tfrac{1}{2}) \sum_{l=0}^{L-1} (d\, a'_{nL+l} + f_1 d\, \beta'_{L+l}) 2^{-l}$$

for storing into the first half of a random access memory, the locations of which are addressed by $\alpha$'s and $\beta$'s;

determining the value of symbol $A_{IC}'$ in accordance with the equation $$A_{IC}' = A_{IC} 2^{-(L-1)} = -2^{-L}(c + f_1 d)$$

with $A_{IC}'$ also being stored in the first half of an appropriate initial-condition memory, to be read out at a time proper for placing into a first summing means;

determining the value of said symbol A in accordance with the equation $$A = A'_{IC} 2^{-(N-L)} + \sum_{n=0}^{\frac{N}{L}-1} A'_n 2^{-nL}$$

by adding in said first summing means the appropriately shifted quantities $A_n'$ which have been read from the first half of said random access memory;

determining the values of symbol $B_n'$ in accordance with the equation $$A'_n = \sum_{l=0}^{L-1} \beta_{nL+l} 2^{-l} = (\tfrac{1}{2}) \sum_{l=0}^{L-1} [d\, a'_{nL+l} + (c + f_2 d\, \beta'_{nL+l})] 2^{-l}$$

for storing into the second half of said random access memory, the locations of which are addressed by the $\alpha$'s and $\beta$'s;

determining the value of symbol $B_{IC}'$ in accordance with the equation $$B_{IC} = -\tfrac{1}{2}[c + d(1 + f_2)];$$
$$B_{IC}' = 2^{-(L-1)} B_{IC} = -2^{-L}[c + d(1 + f_2)]$$

and with $B_{IC}'$ being stored in the second half of said appropriate initial condition memory to be read out at a proper time for placing into a second summing means; and determining the value of said symbol B in accordance with the equation $$B = B'_{IC} 2^{-(N-L)} + \sum_{n=0}^{\frac{N}{L}-1} B'_n 2^{-nL}$$

by adding in said second summing means the appropriately shifted quantities $B_n'$ which have been read from the second half of said random access memory.

The direct computations of A and B, a pair of complex numbers whose basis vectors not necessarily orthogonal, is the objective of this set of operatives, without having to first compute intermediate products. Both A and B are expressed as inner products. The formation of such products is performed most efficiently by distributed arithmetic. A may be expressed in terms of bits 0,1 or in terms of bits $-1,1$.

Similarly, B may be expressed in terms of bits 0,1 or in terms of bits $-1,1$.

A from equation C7 is expanded and expressed as a sum of $A_n$ (C-21) and an initial condition $A_{IC}$ (C20) for serial implementation or, a more efficient L-fold parallelism can be evoked by expressing A as a sum of $A_n'$ and an initial condition $A_{IC}'$.

Similarly, B from equation C8 is restated in equations C26 and C27 then is expressed in equation C29 as a sum of $B_n$ and an initial condition $B_{IC}$.

Again L-fold parallelism can be applied by expressing B as a sum of $B_n'$ and an initial condition $B_{IC}'$.

The values of the $A_n$ and $B_n$ ($A_{IC}$ and $B_{IC}$ are subsets of $A_n$ and $B_n$) are stored in memory and are addressed by the bits, $\alpha_n$ and $\beta_n$, of the respective input data words, "a" and "b". These stored values are shifted and summed, in accordance with equations C19 and C29, to provide the answers, A and B.

In a more efficient fashion, the values of $A_n'$ and $B_n'$ (again, $A_{IC}'$ and $B_{IC}'$ are subsets of $A_n'$ and $B_n'$) are stored in a memory and are addressed by the bits $\alpha_n$ and $\beta_n$. These stored values are shifted and summed in accordance with equations C23 and C31 (but only 1/L as often as before) to provide the answers, A and B.

The specific values of the numbers which are stored in the memories according to equations C24, C25, C32, and C34 in Appendix C, are determined by our specific choice of complex number representation, as shown in equations C35–C40, and more generally as shown in equations C1, C2, and C3 of Appendix C.

The mechanizations of the above can be best understood by again setting up a memory table as shown in FIG. 8. The mechanization is still essentially as shown in FIGS. 2 and 3. Deviations are described below.

Case I treats the orthogonal vectors, so:

$$v = j$$

$$v^2 = f_1 + f_2 v = -1$$

$$f_1 = -1, f_2 = 0$$

The results of Case I are shown in FIG. 7.

Case II treats the relationship:

$$v^3 - 1 = (v - 1)(v^2 + v + 1) = 0$$

$$v^2 = -1 - v$$

$$f_1 = f_2 = -1$$

The results of Case II are shown in FIG. 8.

Again, the leftmost four (4) columns contain the possible patterns of bits of the incoming data. The next column identifies the complex memory location which is addressed by the incoming data. The $A_n'$ and $B_n'$ columns identify the quantity which are being read out of the memory (QA0–QA7 and QB0–QB9) and the sign of each indicating whether the quantities are to be added to or subtracted from the contents of their respective accumulators. The two (2) rightmost columns, ±A and ±B are simply redundant statements of the sign. The now labeled IC simply flags these quantities, QA5 and QB5, which are read out on the initial-condition lines, 138 and 140, respectively.

Figure 9:
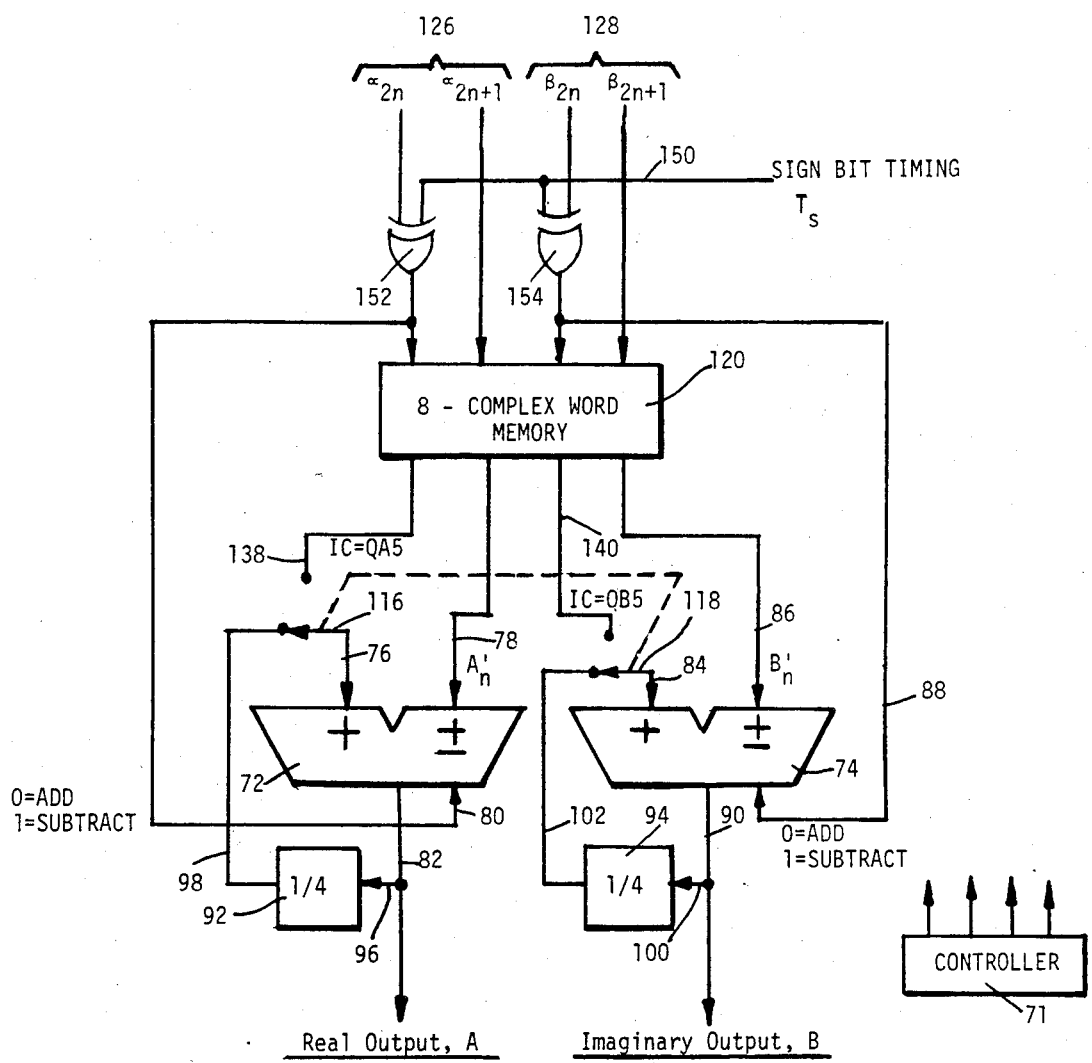
FIG. 9 shows a block diagram of a complex-multiplier architecture of this invention for the particular case with a parallelism indicator equal L to 2 with not necessarily orthogonal basis vectors, and which uses initial-condition outputs from addresses inside a RAM.

FIG. 9 shows an L=2 arrangement for general basis vectors. The real component of the input data is blocked two bits at a time on input line pair 126; the imaginary component of the input data is blocked two bits at a time on line pair 128. At the sign-bit time, the sign-bit timing pulse, $T_s$, drives line 150 to a "1" state, and the sign bits which appear on lines $\alpha_{2n}$ and $\beta_{2n}$ are complemented by EXOR gates 152 and 154. Controller 71 is merely a counter and a ROM which identifies the location in the clocking cycle of this ALU.

At the beginning of the cycle, switch 116 is used to connect input 76 of adder 72 to port 138 of the memory 120, thereby reading initial condition QA5, and switch 118 is used to connect input 84 of adder 74 to port 140 of memory 120, thereby reading initial condition QB5.

Simultaneously the input data which appears on input lines 126 and 128 addresses memory 120 in accordance with the table of FIG. 8 and reads out the appropriate memory on lines 78 into adder 72 and on lines 86 into adder 74. The most significant data bits on 126 and 128 are used to control the add/subtract command to address 72 and 74 via lines 80 and 88, respectively. Therefore, during this first clock cycle, we see that the initial condition values are being summed with the memory content which is addressed by the input data.

During all subsequent clock periods of this computational cycle, controller 71 directs switch 116 to connect input 76 of adder 72 to output 98 of divider 92, and directs switch 118 to connect input 84 of adder 74 to output 102 of divider 94. We will assume a one-clock period delay is passing data through the adders 72 and 74, so that during clock time 2 the second set of bits which appear on lines 126 and 128 are addressing memory 120 and reading the contents in accordance with FIG. 8 onto lines 78 and 86. The previously computed sums from clock cycle 1 appear on lines 82 and 90, are right-shifted by two binary places by divider 92 and 94 in order to accomplish the divide-by-four functions, and recirculated back into adders 72 and 74 via ports 76 and 84. During the final clock period of the computational cycle, the sign-bit timing pulse on line 150 complements the sign bits on input lines 126 and 128 by EXOR gates 152 and 154. This completes the computational cycle. During the following clock period which begins the next computational cycle, the complex product components, A and B, are read from lines 82 and 90.

As a specific example (refer to FIG. 9) let us further develop Case III. The basis vectors are 1 and $r^{-j2\pi/3}$ (Complex cube root of 1). Again we will assume L=2 for simplicity. Arbitrarily, we will choose c=0.623 and d=0.254. The memory will then be as displayed below:

|     | Memory | $A_n'$ | $B_n'$ |
| --- | --- | --- | --- |
|     | 0 | −0.27675 | −0.46725 |
|     | 1 | −0.40375 | −0.28275 |
|     | 2 | −0.53075 | 0.09825 |
|     | 3 | −0.65775 | −0.08625 |
|     | 4 | 0.03475 | 0.34025 |
| IC: | 5 | −0.09225 | −0.15575 |
|     | 6 | −0.21925 | −0.02875 |
|     | 7 | −0.34625 | −0.21325 |

These values will be addressed by the input bits. FIG. 9 is further expanded in FIG. 10 which shows the extreme simplicity of the gates of the control logic and memory address decoding after the logic requirements have been combined and reduced.

Figure 10:
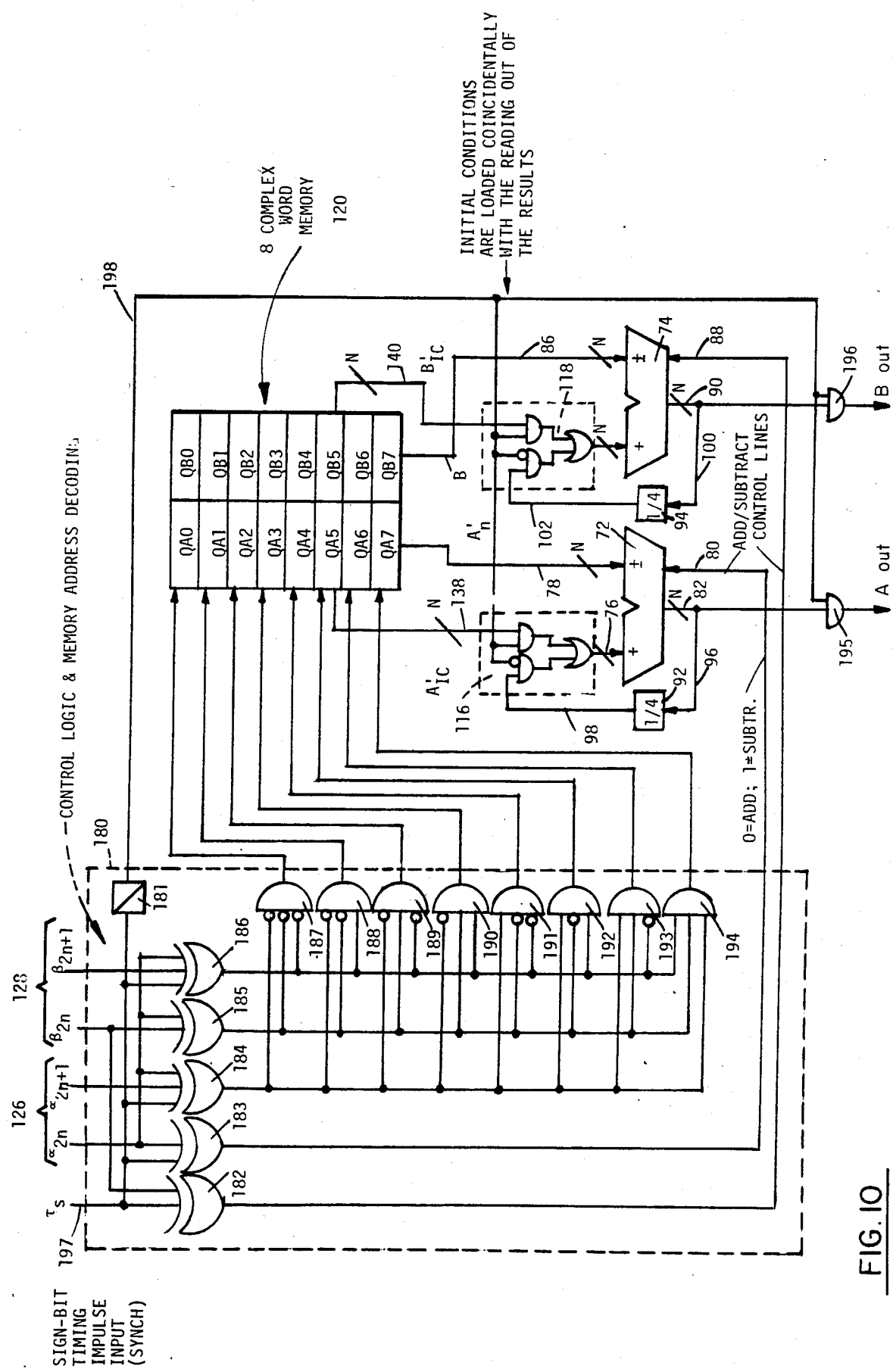
FIG. 10 shows a more detailed block diagram of the multiplier of FIG. 9.

FIG. 10 shows a particular adaptation of FIG. 9. Specifically, we have shown in block 180 the addressing logic for memory 120 in gates 184 through 194. Gates 152 and 154 of FIG. 9 are replaced by gates 183 and 182, respectively in FIG. 10. The component parts of switches 116 and 118 are shown in detail, output gates 195 and 196 have been added, and controller 71 of FIG. 9 has been replaced by 1-stage delay 181 in FIG. 10.

Extensions to other cases are obvious and will not be pursued. Direct evaluation of the memory contents shows that the values of $A_n'$ for both cases I and II are the same, but for Case II we have the worst case memory requirement of 8 locations required. The sign determinations are still established by $\alpha_{2n}$ for the "A" accumulator and by $\beta_{2n}$ for the "B" accumulator. With the larger memory required for Case II come the simplification of the elimination of switches 112 and 114 as well as the removal of the control logic 104.

I claim:

1. A method of performing complex multiplication of a complex multiplier comprising a multiplier real portion and a multiplier imaginary portion, and a complex multiplicand comprising a multiplicand real portion and a multiplicand imaginary portion, wherein said multiplicand real portion comprises a plurality of real L-bit subwords and said multiplicand imaginary portion comprises a plurality of imaginary L-bit subwords, wherein L is greater than 1, and wherein said complex multiplication method comprises:

(a) loading a memory with first and second numbers representative of said complex multiplier;

(b) addressing said memory with a first of said real L-bit subwords and a first of said imaginary L-bit subwords to produce a first memory output at a first memory port and a second memory output at a second memory port;

(c) applying said first memory output to a first input port of a first adder/subtractor and applying a first recirculation input to a second input port of said first adder/subtractor;

(d) combining said first memory output and said first recirculation input to produce a first adder/subtractor output;

(e) applying said second memory output to a first input port of a second adder/subtractor and applying a second recirculation input to a second input port of said second adder/subtractor;

(f) combining said second memory output and said second recirculation input to produce a second adder/subtractor output; and (g) repeating steps (b) through (f) for successive real and imaginary L-bit subwords of said complex multiplicand until all such subwords of a single complex multiplicand hve been processed.

2. The method of performing complex multiplication of claim 1 wherein:

during the processing of the first real L-bit subword of a single complex multiplicand, said first recirculation input to said first adder/subtractor comprises a first initial condition value;

during the processing of the first imaginary L-bit subword of said single complex multiplicand, said second recirculation input to said second adder/subtractor comprises a second initial condition value;

during the processing of the second and subsequent real L-bit subwords of said single complex multiplicand, said first recirculation input to said first adder/subtractor comprises an output of said first adder/subtractor, shifted L bits; and during the processing of the second and subsequent imaginary L-bit subwords of said single complex multiplicand, said second recirculation input to said second adder/subtractor comprises an output of said second adder/subtractor, shifted L bits.

3. The method of performing complex multiplication of claim 2 additionally comprising:

producing first operation selection signals based on said real L-bit subwords;

applying said first operation signals to said first adder/subtractor to control whether said combining step comprises addition or subtraction;

producing second operation selection signals based on said imaginary L-bit subwords; and applying said second operation signals to said second adder/subtractor to control whether said combining step comprises addition or subtraction.

4. The method of performing complex multiplication of claim 3, wherein:

said multiplicand real portion includes a real sign bit;

said multiplicand imaginary portion includes an imaginary sign bit;

said first operation selection signal is produced based on said real sign bit; and said second operation selection signal is produced based on said imaginary sign bit.

5. The method of claim 2 additionally comprising:

loading said first initial condition value into a first initial condition register; and loading said second initial condition value into a second initial condition register.

6. The method of performing complex multiplication of claim 2, wherein:

(a) said first initial condition value comprises $A'_{IC}$;

(b) said second initial condition value comprises $B'_{IC}$;

(c) the memory location of said memory addressed at a clock time "n" has contents $A'_n$ and $B'_n$;

(d) said memory contents $A'_n$ are output from said memory at said first memory port;

(e) said memory contents $B'_n$ are output from said memory at said second memory port;

(f) said complex multiplier comprises $a+vb$ and said complex multiplicand comprises $c+vd$, wherein v is a basis vector;

(g) N is the number of binary bits in the real portion a or imaginary portion b of said multiplier;

(h) $\alpha_n$ is the nth bit of said real portion a, $\bar{\alpha}_n$ is the complement of $\alpha_n$, and $\alpha'_n = \alpha_n - \bar{\alpha}_n$; and (i) $\beta_n$ is the nth bit of said imaginary portion b, $\bar{\beta}_n$ is the complement of $\bar{\beta}_n$, and $\beta'_n = \beta_n - \bar{\beta}_n$.

7. The method of performing complex multiplication of claim 6, wherein the basis vector v is orthogonal to the real basis vector, and is defined as $\sqrt{-1}$.

8. The method of performing complex multiplication of claim 7 wherein:

$$A'_n = (\tfrac{1}{2}) \sum_{l=0}^{L-1} (c\, \alpha'_{nL+l} - d\, \beta'_{nL+l}) 2^{-l};$$

$$B'_n = (\tfrac{1}{2}) \sum_{l=0}^{L-1} (d\, \alpha'_{nL+l} + c\, \beta'_{nL+l}) 2^{-l};$$

$$A'_{IC} = -2^{-L}(c - d); \text{ and}$$

$$B'_{IC} = 2^{-L}(c + d).$$

9. The method of performing complex multiplication of claim 8, wherein:

said first adder/subtractor output comprises a real portion A, wherein:

$$A = A'_{IC} 2^{-(N-L)} + \sum_{n=0}^{\frac{N}{L}-1} A'_n 2^{-nL}; \text{ and}$$

said second adder/subtractor output comprises B, wherein:

$$B = B'_{IC} 2^{-(N-L)} + \sum_{n=0}^{\frac{N}{L}-1} B'_n 2^{-nL}.$$

10. The method of performing complex multiplication of claim 6, wherein values $f_1$ and $f_2$ are related to the basis vector v according to the equation $v^2 = f_1 + v f_2$, and wherein:

$$A'_n = \tfrac{1}{2} \sum_{l=0}^{L-1} [C(\alpha'_{nL+l}) + f_1 d(\beta'_{nL+l})] 2^{-l}$$

$$B'_n = \tfrac{1}{2} \sum_{l=0}^{L-1} [d(\alpha'_{nL+l}) + (c + f_2 d)(\beta'_{nL+l})] 2^{-l}$$

$$A'_{IC} = -2^{-L}(c + f_1 d); \text{ and}$$

$$B'_{IC} = 2^{-L}[c + d(1 + f_2)].$$

11. The method of performing complex multiplication of claim 10, wherein:
said first adder/subtractor output comprises a real portion A, wherein:

$$A = A'_{IC} 2^{-(N-L)} + \sum_{n=0}^{\frac{N}{L}-1} A'_n 2^{-nL}; \text{ and}$$

said second adder/subtractor output comprises an imaginary portion B, wherein:

$$B = B'_{IC} 2^{-(N-L)} + \sum_{n=0}^{\frac{N}{L}-1} B'_n 2^{-nL}.$$

12. An apparatus for performing complex multiplication of a complex multiplier comprising a multiplier real portion and a multiplier imaginary portion, and a complex multiplicand comprising a multiplicand real portion and a multiplicand imaginary portion, wherein said multiplicand real portion comprises a plurality of real L-bit subwords and said multiplicand imaginary portion comprises a plurality of imaginary L-bit subwords, wherein L is greater than 1, and wherein said complex multiplication apparatus comprises:
(a) a memory having first and second output ports, wherein said memory has stored in it first and second numbers representative of said complex multiplier so that when said memory is addressed with a pair of said real and imaginary L-bit subwords, a first memory output is produced at said first memory output port and a second memory output is produced at said second memory output port;
(b) a first adder/subtractor having an output port, a first input port connected to said first memory output port for receiving said first memory output, and a second input port connected to said output port for receiving a first recirculation input, wherein said first adder/subtractor combines said first memory output and said first recirculation input to produce a first adder/subtractor output on said output port;
(c) a first scaling multiplier connected to said first adder/subtractor between said output and said second input to shift said first adder/subtractor output L bits;
(d) a second adder/subtractor having an output port, a first input port connected to said second memory output port for receiving said second memory output, and a second input port connected to said output port for receiving a second recirculation input, wherein said second adder/subtractor combines said second memory output and said second recirculation input to produce a second adder/subtractor output on said output port; and
(e) a second scaling multiplier connected to said second adder/subtractor between said output and said second input to shift said second adder/subtractor output L bits.

13. The apparatus for performing complex multiplication of claim 12, additionally comprising means connected to said first and second adder/subtractors and responsive to at least a portion of said real and imaginary L-bit subwords to produce operation signals to control whether said adder/subtractors add or subtract said first memory output and first recirculation input, and said second memory output and second recirculation input.

14. The apparatus for performing complex multiplication of claim 12, additionally comprising:
a first initial condition register selectively connected to said second input of said first adder/subtractor, for storing a first initial condition value; and
a second initial condition register selectively connected to said second input of said second adder/subtractor, for storing a second initial condition value.

15. The apparatus for performing complex multiplication of claim 14, wherein:
(a) said first initial condition value comprises $A'_{IC}$;
(b) said second initial condition value comprises $B'_{IC}$;
(c) the memory location of said memory addressed at a clock time "n" has contents $A'_n$ and $B'_n$;
(d) said memory contents $A'_n$ are output from said memory at said first memory port;
(e) said memory contents $B'_n$ are output from said memory at said second port;
(f) said complex multiplier comprises a+vh and said complex multiplicand comprises c+vd, wherein v is a basis vector;
(g) N is the number of binary bits in the real portion a or imaginary portion b of said multiplier;
(h) $\alpha_n$ is the nth bit of said real portion a, $\overline{\alpha}_n$ is the complement of $\alpha_n$, and $\alpha'_n = \alpha_n - \overline{\alpha}_n$; and
(i) $\beta_n$ is the nth bit of the imaginary portion b, $\overline{\beta}_n$ is the complement of $\beta'_n$, and $\beta'_n = \beta_n - \overline{\beta}_n$.

16. The apparatus for performing complex multiplication of claim 22, wherein the basis vector v is orthogonal to the real basis vector, and is defined as $\sqrt{-1}$.

17. The apparatus for performing complex multiplication of claim 16 wherein:

$$A'_n = (\tfrac{1}{2}) \sum_{l=0}^{L-1} (c\, \alpha'_{nL+l} - d\, \beta'_{nL+l}) 2^{-l};$$

$$B'_n = (\tfrac{1}{2}) \sum_{l=0}^{L-1} (d\, \alpha'_{nL+l} + c\, \beta'_{nL+l}) 2^{-l};$$

$$A'_{IC} = -2^{-L}(c - d); \text{ and}$$

$$B'_{IC} = 2^{-L}(c + d).$$

18. The apparatus for performing complex multiplication of claim 17, wherein:

said first adder/subtractor output comprises a real portion A, wherein:

$$A = A'_{IC}2^{-(N-L)} + \sum_{n=0}^{\frac{N}{L}-1} A'_n 2^{-nL}; \text{ and}$$

said second adder/subtractor output comprises B, wherein:

$$B = B'_{IC}2^{-(N-L)} + \sum_{n=0}^{\frac{N}{L}-1} B'_n 2^{-nL}.$$

19. The apparatus for performing complex multiplication of claim 15, wherein values $f_1$ and $f_2$ are related to the basis vector v according to the equation $v^2 = f_1 + vf_2$, and wherein:

$$A'_n = \tfrac{1}{2}\sum_{l=0}^{L-1}[C(\alpha'_{nL+l}) + f_1 d(\beta'_{nL+l})]2^{-l}$$

-continued $$B'_n = \tfrac{1}{2}\sum_{l=0}^{L-1}[d(\alpha'_{nL+l}) + (c + f_2 d)(\beta'_{nL+l})]2^{-l}$$

$$A'_{IC} = -2^{-L}(c + f_1 d); \text{ and}$$

$$B'_{IC} = 2^{-L}[c + d(1 + f_2)].$$

20. The apparatus for performing complex multiplication of claim 19, wherein:

said first adder/subtractor output comprises a real portion A, wherein:

$$A = A'_{IC}2^{-(n-L)} + \sum_{n=0}^{\frac{N}{L}-1} A'_n 2^{-nL}; \text{ and}$$

said second adder/subtractor output comprises an imaginary portion B, wherein:

$$B = B'_{IC}2^{-(N-L)} + \sum_{n=0}^{\frac{N}{L}-1} B'_n 2^{-nL}.$$

* * * * *